United States Patent
Aldrich, III et al.

(10) Patent No.: US 7,603,224 B2
(45) Date of Patent: Oct. 13, 2009

(54) CAM PHASING CONTROL SYSTEM FOR IMPROVING REGENERATION EFFICIENCY

(75) Inventors: William L. Aldrich, III, Davisburg, MI (US); Lyle E. Hamilton, Howell, MI (US); James L. Worthing, Munith, MI (US); Donald D. Crites, Washington, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 11/954,829

(22) Filed: Dec. 12, 2007

(65) Prior Publication Data

US 2009/0030585 A1    Jan. 29, 2009

Related U.S. Application Data

(60) Provisional application No. 60/952,437, filed on Jul. 27, 2007.

(51) Int. Cl.
*B60T 7/12* (2006.01)
*F01L 1/34* (2006.01)

(52) U.S. Cl. .............. 701/103; 123/90.15; 123/198 DB (58) Field of Classification Search .......... 701/103, 701/104, 112, 113; 123/325, 198 F, 198 DB, 123/90.15, 90.16, 90.17, 90.23, 90.31, 316, 123/321, 322, 481, 568.14, 192.1; 290/46, 290/51, 40 B, 40 C, 40 R
See application file for complete search history.

(56) References Cited

U.S. PATENT DOCUMENTS

| | | | | |
|---|---|---|---|---|
| 6,341,586 B2 * | 1/2002 | Tachibana et al. | ........ | 123/90.15 |
| 6,414,401 B1 * | 7/2002 | Kuroda et al. | ............. | 290/40 C |
| 6,488,008 B1 * | 12/2002 | Jankovic et al. | ............. | 123/399 |
| 6,988,472 B2 * | 1/2006 | Takahashi et al. | ........ | 123/90.15 |
| 6,997,149 B1 * | 2/2006 | Ruiz | ....................... | 123/90.15 |
| 7,204,214 B2 * | 4/2007 | Miyaji et al. | ............. | 123/90.15 |
| 7,249,589 B1 * | 7/2007 | Tomatsuri et al. | ........... | 123/357 |
| 7,458,353 B2 * | 12/2008 | Takahashi | ................ | 123/179.4 |

\* cited by examiner

*Primary Examiner*—Stephen K. Cronin
*Assistant Examiner*—Johnny H. Hoang
(74) *Attorney, Agent, or Firm*—Harness, Dickey & Pierce, P.L.C.

(57) ABSTRACT

A control system includes a cam position calculation module that determines intake and exhaust cam positions during operation of an engine. The engine includes a regeneration and fuel cut-off (FCO) mode. A cam position adjustment module generates alternate intake and exhaust cam positions during the regeneration and FCO mode. A cam positioning module positions the intake and exhaust cams based on lower values of the intake and exhaust cam positions and the alternate intake and exhaust cam positions, respectively, during the regeneration and FCO mode.

19 Claims, 6 Drawing Sheets

CAM PHASING CONTROL SYSTEM FOR IMPROVING REGENERATION EFFICIENCY

CROSS-REFERENCE TO RELATED APPLICATIONS

This application claims the benefit of U.S. Provisional Application No. 60/952,437, filed on Jul. 27, 2007. The disclosure of the above application is incorporated herein by reference in its entirety.

FIELD

The present disclosure relates to engine control systems, and more particularly to cam phasing control systems for improving regeneration efficiency.

BACKGROUND

The statements in this section merely provide background information related to the present disclosure and may not constitute prior art.

Hybrid powertrains typically include a first torque generator, such as an internal combustion engine (ICE), and a second torque generator, such as an electric machine (EM). Both can provide torque to a driveline to propel a vehicle.

In a full hybrid powertrain, the EM can drive the drivetrain directly without transferring torque through a component of the ICE. In a mild hybrid powertrain, the EM is coupled with the ICE through the accessory drive. Torque generated by the EM is transferred to the drivetrain through the ICE. An exemplary mild hybrid powertrain may include a belt alternator starter (BAS) system. In the BAS system, the EM is coupled to the ICE via a traditional belt and pulley configuration, which drives other accessory components including, but not limited to, pumps and compressors.

SUMMARY

A control system comprises a cam position calculation module that determines intake and exhaust cam positions during operation of an engine. The engine also operates in a regeneration and fuel cut-off (FCO) mode. A cam position adjustment module generates alternate intake and exhaust cam positions during the regeneration and FCO mode. A cam positioning module positions the intake and exhaust cams based on lower values of the intake and exhaust cam positions and the alternate intake and exhaust cam positions, respectively, during the regeneration and FCO mode.

In other features, a regeneration detection module detects when the engine is in the regeneration and FCO mode. The alternate intake and exhaust cam positions are set to park or non-park positions. The alternate intake and exhaust cam positions are set to less than or equal to approximately 4 degrees. The alternate intake and exhaust cam positions are set to less than or equal to than approximately 3 degrees. The alternate intake and exhaust cam positions are set to less than or equal to than approximately 2 degrees.

A vehicle comprises the control system and further comprises the engine that includes intake and exhaust cam phasers, a belt/pulley and an electric machine that is coupled by the belt/pulley to the engine.

A vehicle comprises the control system and further comprises the engine that includes intake and exhaust cam phasers and a belt alternator starter system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The present disclosure reduces engine spinloss for belt alternator starter (BAS) Hybrid vehicles while fuel cutoff (FCO) and regeneration is active. Reduction in spinloss tends to allow more efficient regeneration for a given deceleration rate. Reduction in spinloss without a corresponding increase in regeneration improves drivability.

During operation, the engine control module calculates intake and exhaust cam position values for the intake and exhaust cam phasers. During FCO/regeneration, the present disclosure limits engine intake and exhaust cam positions to adjusted cam position values. The adjusted cam position values may be determined during calibration. For example only, the cam position values may be chosen such that the cams are positioned at park or near park to gain the benefit of reduced pumping loss for a fixed MAP value. In some circumstances, the adjusted cam position values may be set at a value near park to prevent the cams from engaging a park pin.

The present disclosure monitors the FCO/regeneration state in a hybrid vehicle. When the FCO/regeneration state is active, the present disclosure actively limits the cam positions (intake and exhaust) to park or an adjusted cam position value near park. For example only, if the adjusted cam position value is 2 degrees, after regeneration and FCO are entered, the cams will be limited to 2 degrees when the normally desired cam position value is greater than the adjusted cam position value.

When FCO ends (for example only, when the number of injectors that are enabled >0), the cams return to the normal cam position value. Additionally, the adjusted cam position values may be selected to be a low non-zero value (such as 2 degrees). The value chosen for the adjusted cam position values may be selected so that the cams will move to park or near the park position. The near park position may be used to prevent engagement of the park pins. Using this approach reduces cycling of the park pins, which tends to increase durability.

Figure 1:
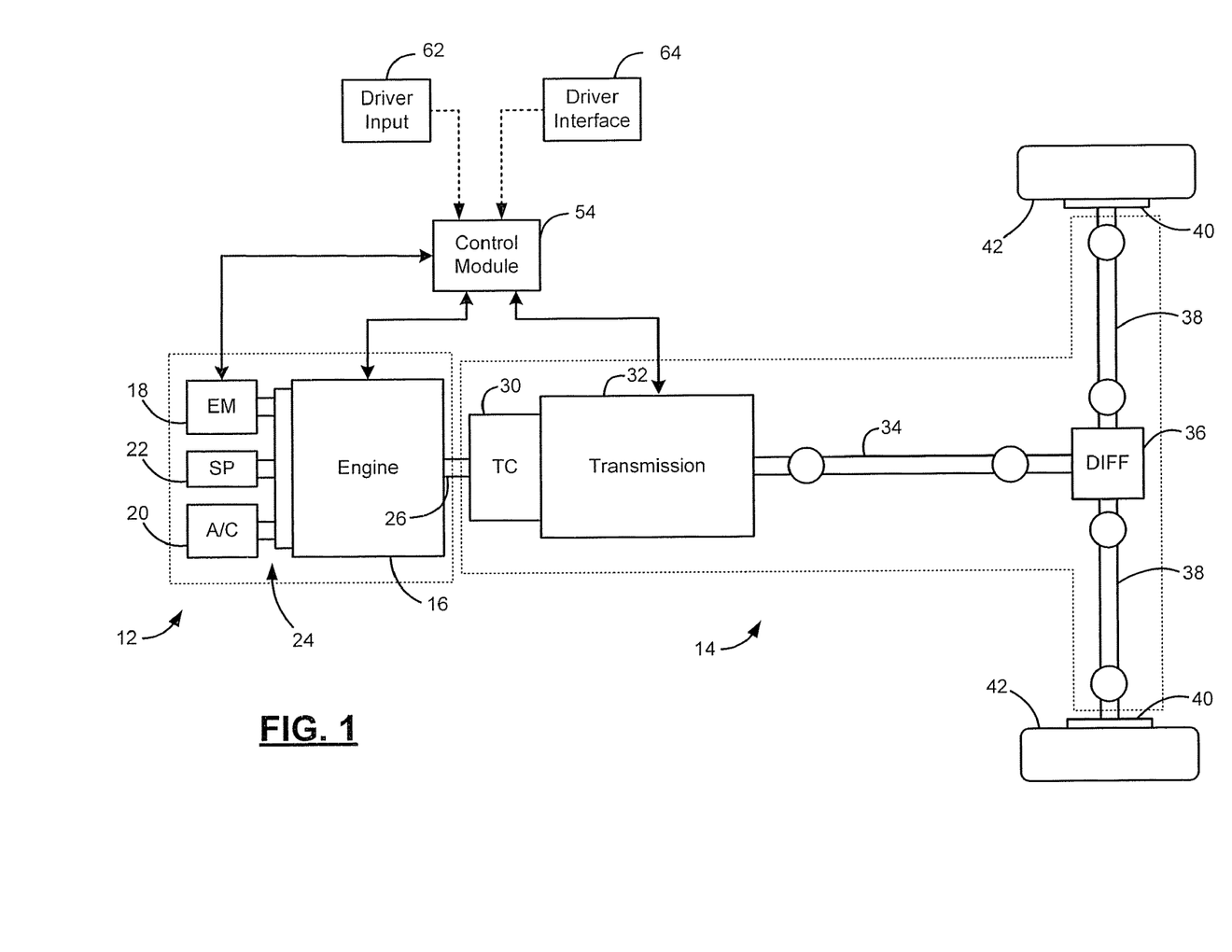
FIG. 1 illustrates a belt alternator starter (BAS) hybrid according to the present disclosure.

Referring now to FIG. 1, an exemplary hybrid powertrain 10 will be described in detail. Although the exemplary powertrain 10 is illustrated as a rear wheel drive (RWD) powertrain, the present disclosure applies to any other powertrain configuration. The exemplary powertrain 10 includes a propulsion system 12 and a drivetrain system 14. The propulsion system 12 includes an engine 16 and an electric machine (EM) 18.

The propulsion system can also include auxiliary components including, but not limited to, an A/C compressor 20 and a steering pump 22. The EM 18 and the auxiliary components are drivingly coupled to the engine 16 using a belt and pulley system 24. The belt and pulley system 24 includes a plurality of pulleys that are fixed for rotation with the EM 18, the auxiliary components and the crankshaft 26 of the engine 16, as well as a belt to enable torque to be transferred to/from the crankshaft 26 from/to the EM 18 and/or the auxiliary components. This configuration is referred to as a belt alternator starter (BAS) system.

The crankshaft 26 of the engine 16 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. Propulsion torque that is output at the crankshaft 26 of the engine 16 is transferred through the drivetrain system components to provide an axle torque at the axle shafts 38 to drive the wheels 42. More specifically, propulsion torque is multiplied by several gear ratios provided by the coupling device 30, the transmission 32 and the differential 36 to provide axle torque at the axle shafts 38.

The powertrain 10 also includes a control module 54, which regulates operation of the powertrain 10. Driver input 62 is transmitted to the control module 54. The driver input 62 can include, but is not limited to, an accelerator pedal and/or a cruise control system. A driver interface 64 also provides input to the control module 54. The driver interface 64 includes, but is not limited to, a transmission range selector (e.g., a PRNDL lever).

Figure 2:
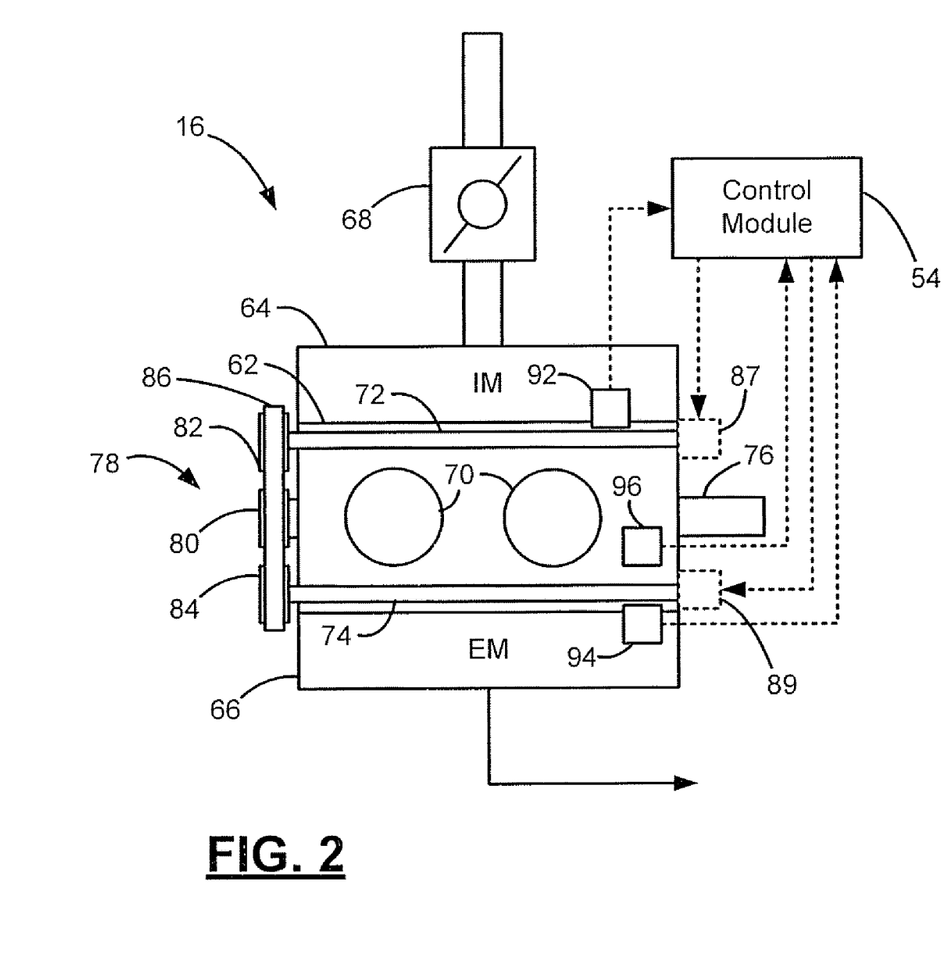
FIG. 2 illustrates the engine of FIG. 1 in further detail.

Referring now to FIG. 2, additional portions of the engine 16 are shown. The engine 16 includes an intake manifold 64 and an exhaust manifold 66. The engine 16 combusts an air and fuel mixture to generate drive torque. More specifically, air is drawn into the intake manifold 64 through a throttle 68. Although the exemplary engine system includes a throttle 68, it is anticipated that the teachings of the present disclosure can be implemented in an engine system that does not include a throttle.

The air is mixed with fuel to form a combustion mixture that is compressed by a piston (not shown) within cylinders 70. Although only two cylinders 70 are shown, the engine may comprise additional cylinders 70. The air, and in some cases the combustion mixture, travels into the cylinder 70 through an intake port (not shown), which is selectively opened by an intake valve (not shown).

Combustion of the combustion mixture is induced within the cylinder 70 (e.g., via a spark from a spark plug or the heat of compression). After the combustion event, the product gases are exhausted from the cylinder 70 through an exhaust port (not shown), which is selectively opened by an exhaust valve (not shown). It is anticipated that the engine system can include one or more intake ports and/or exhaust ports with respective intake and exhaust valves.

Movement of the intake and exhaust valves is induced by respective intake and exhaust camshafts 72, 74, which are rotatably driven by the crankshaft 76 via a timing arrangement 78. More specifically, the crankshaft 76 includes a timing sprocket 80 and the intake and exhaust camshafts include respective timing sprockets 82, 84. A timing connection 86 drivingly interconnects the timing sprockets 70, 72, 74. For example only, the timing connection 86 may include a timing chain. As can be appreciated, timing gears, a pulley and timing belt, and/or other drive mechanisms may also be used.

The crankshaft 76 rotatably drives the intake and exhaust camshafts 72, 74 to open and close the intake and exhaust ports via the corresponding valves in accordance with a desired engine event timing. More specifically, the opening and closing of the intake and exhaust ports are timed with respect to the linear position of the piston within the cylinder 70 and the particular piston stroke.

The engine system can include intake and exhaust cam phasers 87, 89, shown in phantom. The cam phasers 87, 89 adjust the angular position of the intake and exhaust camshafts 72, 74 relative to the angular position of the crankshaft 76. In this manner, the opening and closing events of the intake and exhaust valves can be independently adjusted to achieve a desired engine operation.

The control module 54 monitors the rotation of the intake and exhaust camshafts 72, 74 as well as of the crankshaft 76. Sensors 92, 94 respectively monitor the rotational positions of each of the intake and exhaust camshafts 72, 74. A sensor 96 monitors the rotational position of the crankshaft 76.

More specifically, respective target wheels (not shown), each of which includes a known number of teeth, are fixed for rotation with each of the respective intake and exhaust camshafts 72, 74 and crankshaft 76. Each sensor 92, 94, 96 detects the rising and falling edges of the teeth of its respective target wheel as they pass the sensor 92, 94, 96 and the sensor 92, 94, 96 generates a pulse-train based thereon. The pulse-trains are provided as signals to the control module 54. Each target wheel may include a gap (e.g., one or two teeth missing) and/or a wider/thinner tooth, each of which operates as a reference point to determine the rotational position of the respective intake and exhaust camshafts 72, 74 and of the crankshaft 76.

Figure 3:
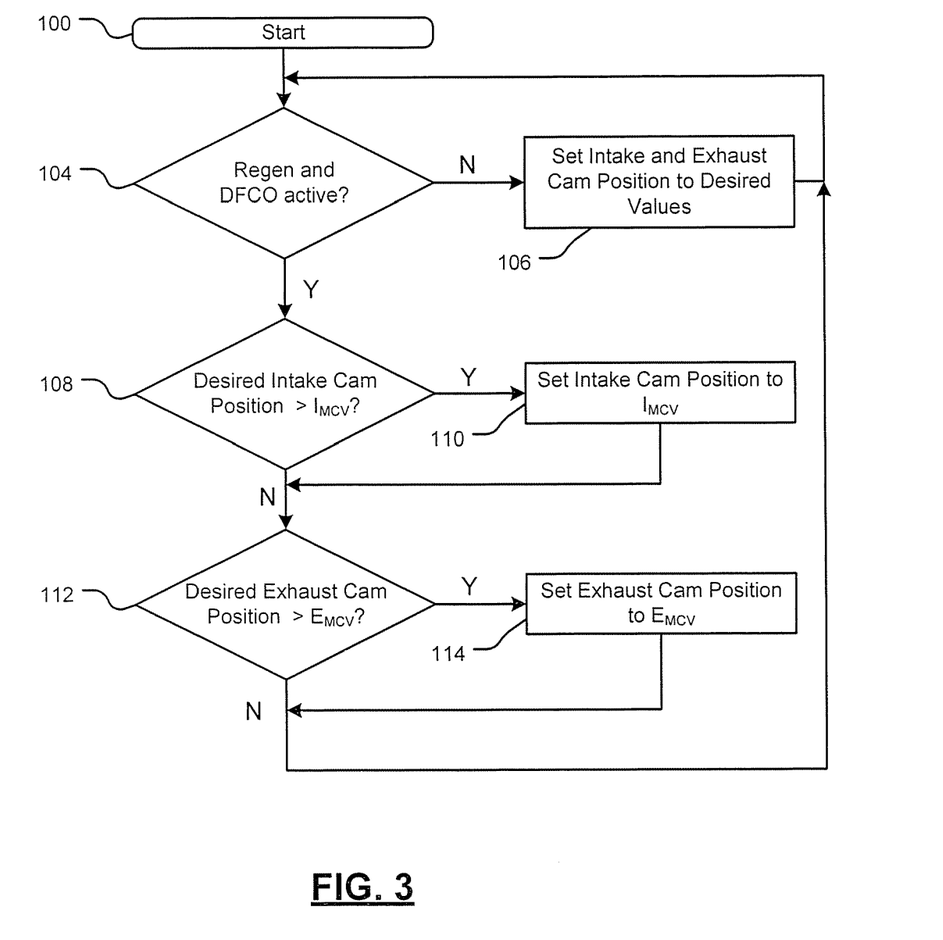
FIG. 3 is a flowchart illustrating the method of controlling intake and exhaust valve positions during fuel cutoff (FCO)/regeneration.

Referring now to FIG. 3, control begins in step 100 and continues with step 104 where control determines whether FCO/regeneration is active. If not, the intake and exhaust cam positions are set to normal desired values in step 106. If step 104 is true, control determines whether the desired intake cam position during FCO/regeneration is greater than a predetermined maximum intake cam position ($I_{MCV}$). If step 108 is true, control sets the intake cam position to $I_{MCV}$. $I_{MCV}$ can be set equal to park or a low non-zero value. Control proceeds from step 108 if false or step 110 with step 112. In step 112, control determines whether the desired exhaust cam position during FCO/regeneration is greater than a predetermined maximum intake cam position ($E_{MCV}$). $E_{MCV}$ can be set to park or a low non-zero value. If step 112 is true, control sets the exhaust cam position to $E_{MCV}$. Control returns from steps 106, 114 and 112 with step 104.

Figure 4:
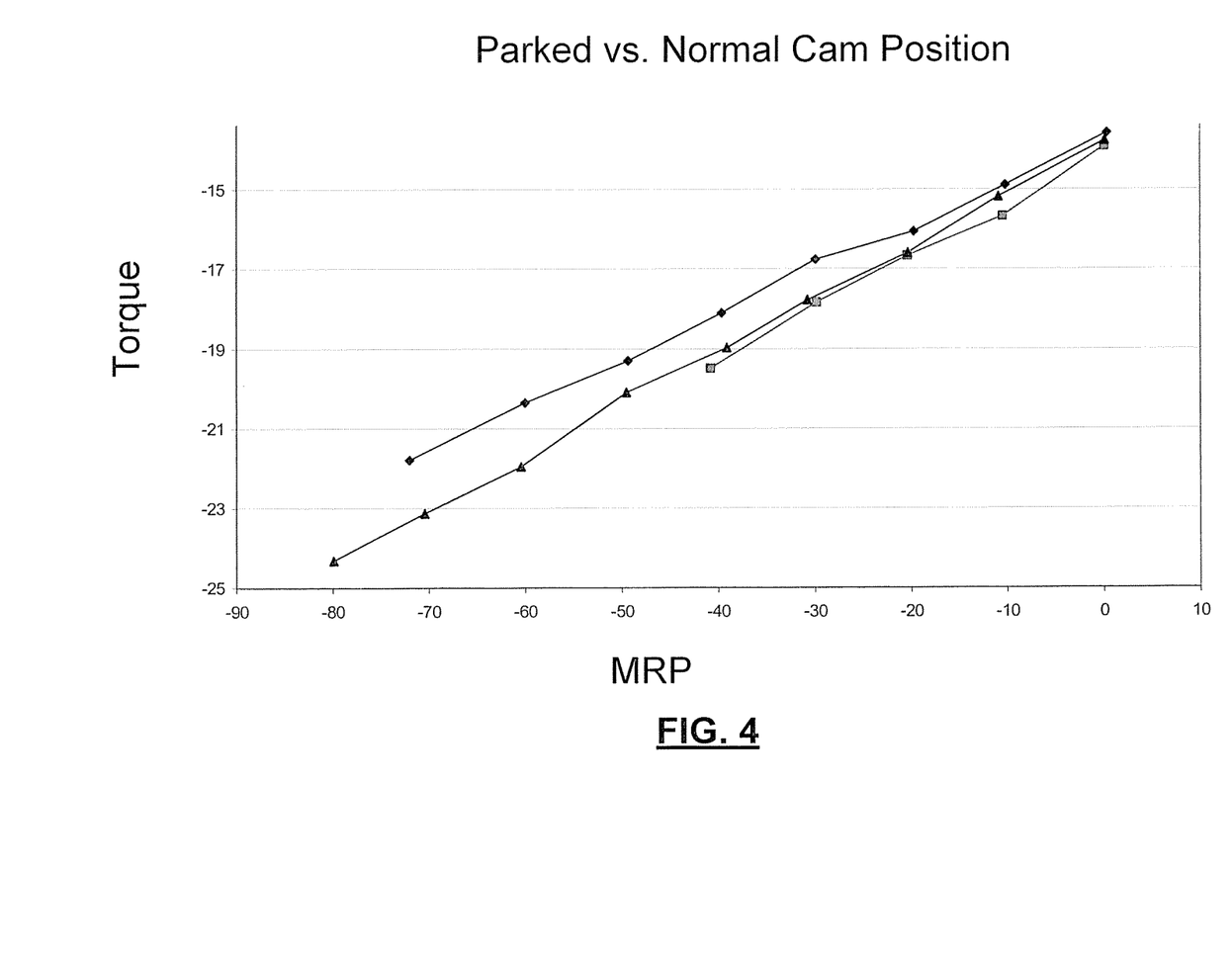
FIG. 4 is a graph illustrating differences between adjusted cam positions according to the present disclosure and normal cam positions during FCO/regeneration.

Referring now to FIG. 4, for a fixed Manifold Absolute Pressure (MAP), the lowest motoring torque tends to occur when the cams are parked (lowest valve overlap). Motoring torque as a function of Manifold Relative Pressure (MRP) (which is effectively manifold absolute pressure (MAP)—Barometer) for 1600 rpm is shown. Other rpm values have similar relationships. In FIG. 4, diamonds represent motoring torque for Park/Park cam position (cam position near target position when in FCO/regen operation). This represents the lowest torque for a given MRP. Triangles represent motoring torque for normally commanded cam position (cam position used without invention). Squares represent motoring torque for cams in max advance positions.

For a fixed Manifold Absolute Pressure (MAP), the lowest motoring torque tends to occur when the cams are parked (lowest valve overlap). Consequently, if a hybrid vehicle targets 25 KPa of MAP during FCO, the difference (park cams vs. as predetermined cam position value) in motoring torque may be determined. For example only, 2 Nm may be the torque difference for some engines.

Concerning FCO, lower MAP tends to be better in reducing compression bobble, and more importantly, allows refuels to occur smoothly. During FCO, a fixed Mass Air Flow (MAF) is targeted, which effectively yields a MAP of about 25 KPa. The benefit of reducing the engine motoring load is that there is a greater potential for regeneration—for a given decel rate, more power can be recovered to the battery. Conversely, if the regeneration level is maintained, drivability is improved.

Figure 5:
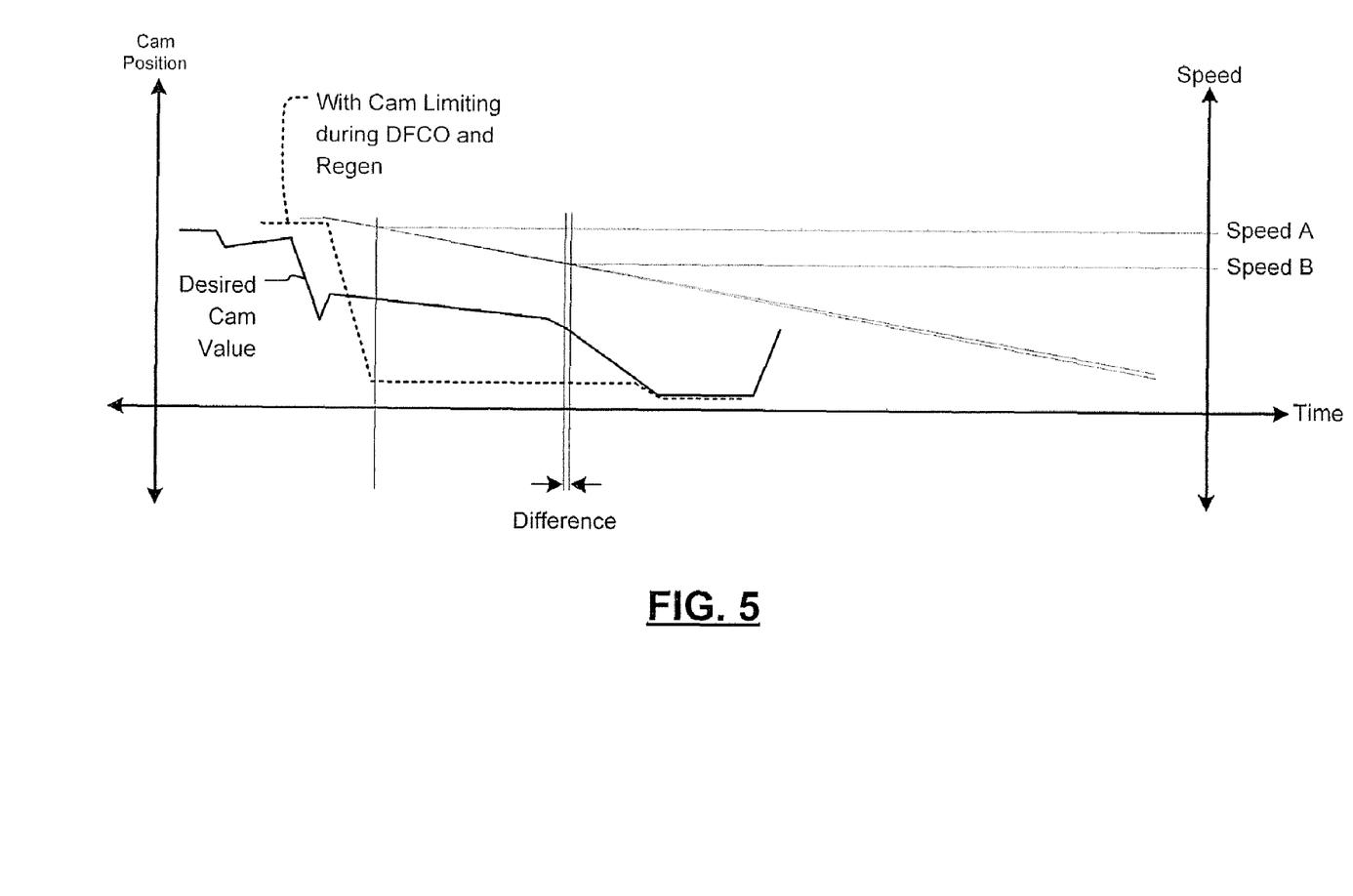
FIG. 5 illustrates differences in deceleration as a result of cam adjustment according to the present disclosure.

Referring now to FIG. 5, for two identical coast downs from a predetermined speed are shown with cam limiting during FCO/regeneration and without cam limiting. For the portion of the test between Speed A and B (for example only, from 91 KPH to 71 KPH), the following estimated results can be obtained:

|  | Park Cam | Not Parked |
| --- | --- | --- |
| Decel time: | 10.75 s | 10.52 s |
| Regen amount | 47.5 KJ | 46.4 KJ |

Figure 6:
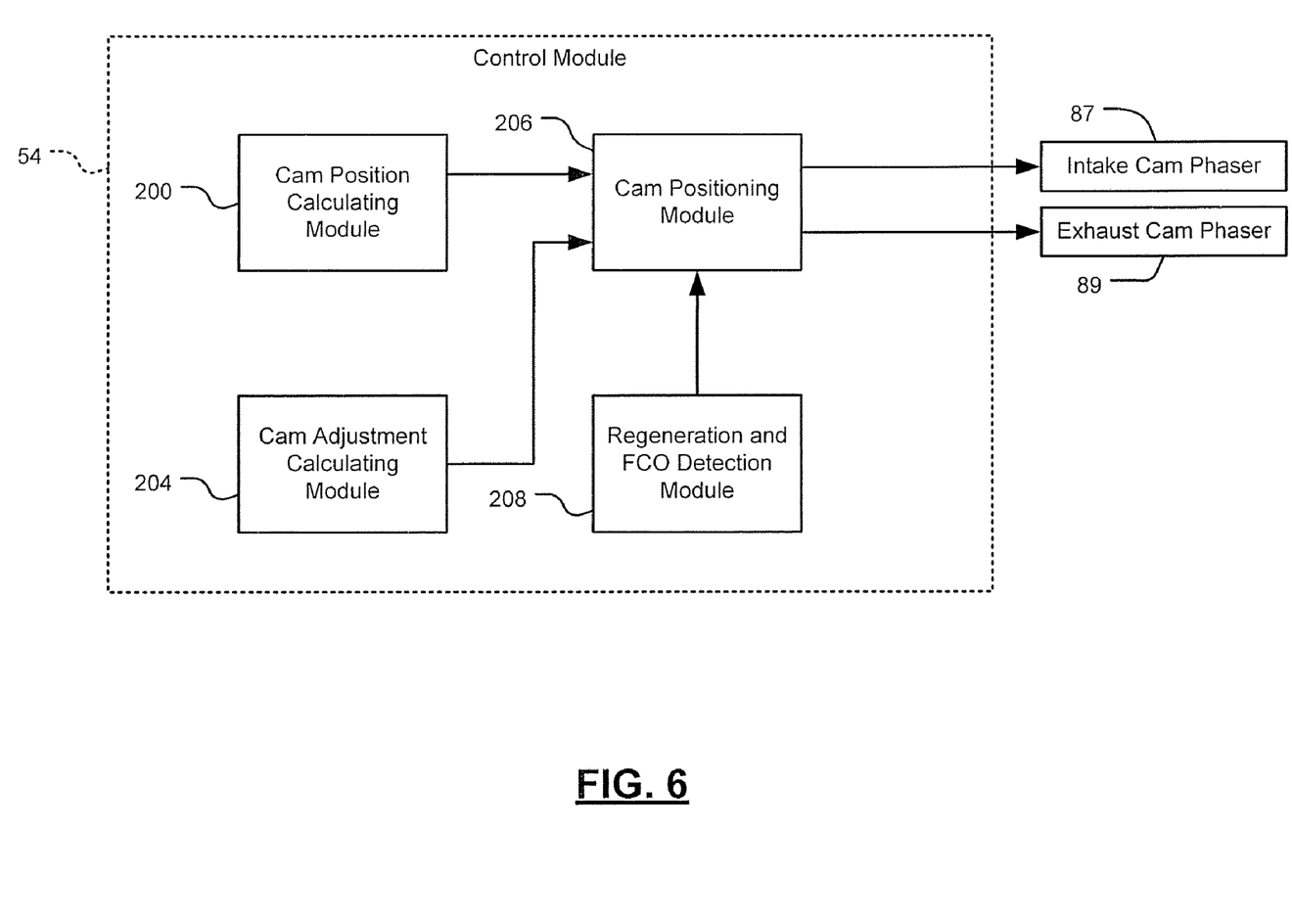
FIG. 6 is a functional block diagram illustrating a control module in accordance with an embodiment of the present disclosure.

Referring now to FIG. 6, an exemplary control module 54 is shown to include a cam position calculation module 200 that determines intake and exhaust cam positions during operation of an engine. The engine may selectively operate in a regeneration and fuel cut-off (FCO) mode. A cam position adjustment module 204 generates alternate intake and exhaust cam positions ($I_{MCV}$ and $E_{MCV}$) during the regeneration and FCO mode as described above.

A cam positioning module 206 positions the intake and exhaust cams based on lower values of the intake and exhaust cam positions and the alternate intake and exhaust cam positions, respectively, during the regeneration and FCO mode. A regeneration detection module 208 detects when the engine is in the regeneration and FCO mode.

During operation, the cam position adjustment module 206 may set the alternate intake and exhaust cam positions to park or non-park positions. The cam position adjustment module 206 may set the alternate intake and exhaust cam positions to less than or equal to approximately 4 degrees. The cam position adjustment module 206 may set the alternate intake and exhaust cam positions to less than or equal to than approximately 3 degrees. The cam position adjustment module 206 may set the alternate intake and exhaust cam positions to less than or equal to than approximately 2 degrees. The cam position adjustment module 206 may set the alternate intake and exhaust cam positions to less than or equal to than approximately 1 degree. As used herein, approximately shall refer to +/−0.5 degrees.

A position near Park/Park (intake/exhaust cam) position may be used to provide the minimum amount of valve overlap without engaging the locking pins of the cam phaser. Minimization of valve overlap reduces pumping losses for a given MRP (manifold relative pressure) which may be a target during FCO.

For example only, the cams may be moved to a position where the minimum valve overlap occurs while not engaging locking pins (about 2 degrees). The intake and exhaust cam positions may be determined with reference to the Park position. Park/Park may be referred to as the 0 degrees for both cams. For the intake cam, a higher position indicates that the intake valve opens earlier with reference to a fixed piston position. The intake cam position may be measured in degrees of advance. Conversely, for the exhaust cam, a higher position may be used to indicate that the exhaust valve opens later (and closes later) with reference to a fixed piston position. The exhaust cam position may be measured in degrees of retard.

Intake cam position may be measured in degrees of advance and exhaust cam position may be measured in degrees of retard. Park/Park or position (0 degrees, 0 degrees) represents a point of minimum valve overlap. The target position during FCO may be chosen as the park position (for minimum overlap) or near park such that valve overlap is minimized to degree limited by engagement of locking pins (for example, 2 degrees) of the cam phaser.

What is claimed is:

1. A system comprising:
a cam position calculation module that determines a current intake cam position and a current exhaust cam position during operation of an engine, wherein said engine includes a regeneration of power mode and a fuel cut-off (FCO) mode;
a cam position adjustment module that generates an alternate intake cam position and an alternate exhaust cam position when said engine is operating in said regeneration of power mode and in said FCO mode; and
a cam positioning module that generates a selected intake cam position based on a lower of said current intake cam position and said alternate intake cam position,
wherein said cam positioning module generates said selected exhaust cam position based on the lower of said current exhaust cam position and said alternate exhaust cam position, and
wherein said cam positioning module positions intake and exhaust cams of said engine based on said selected intake cam position and said selected exhaust cam position.

2. The system of claim 1 further comprising a regeneration detection module that determines when said engine is operating in said regeneration of power mode and said FCO mode.

3. The system of claim 1 wherein said cam position adjustment module sets said alternate intake and exhaust cam positions to non-park positions.

4. The system of claim 1 said alternate intake and exhaust cam positions to less than or equal to approximately 4 degrees.

5. The system of claim 1 said alternate intake and exhaust cam positions to less than or equal to approximately 3 degrees.

6. The system of claim 1 said alternate intake and exhaust cam positions to less than or equal to approximately 2 degrees.

7. The system of claim 1 further comprising:
said engine that includes intake and exhaust cam phasers;
a belt/pulley; and
an electric machine that is coupled by said belt/pulley to said engine.

8. The system of claim 1 further comprising:
said engine that includes intake and exhaust cam phasers; and
a belt alternator starter system.

9. The system of claim 1 said alternate intake and exhaust cam positions to park positions.

10. The system of claim 1 wherein said selected intake cam position and said selected exhaust cam position provide a predetermined amount of valve overlap without engagement of cam phaser locking pins.

11. The system of claim 1 wherein said alternate intake and exhaust cam positions are closer to parked cam positions than said current cam positions.

12. A method comprising:
determining a current intake cam position and a current exhaust cam position during operation of an engine, wherein said engine includes a regeneration of power mode and a fuel cut-off (FCO) mode;
generating an alternate intake cam position and an alternate exhaust cam position when said engine is operating in said regeneration of power mode and in said FCO mode;
setting a selected intake cam position to be a lower of said current intake cam position and said alternate intake cam position;
setting a selected exhaust cam position to be the lower of said current exhaust cam position and said alternate exhaust cam position; and
positioning intake and exhaust cams of said engine based on said selected intake cam position and said selected exhaust cam position.

13. The method of claim 12 further comprising determining when said engine is in said regeneration and FCO mode.

14. The method of claim 12 further comprising setting said alternate intake and exhaust cam positions to non-park positions.

15. The method of claim 12 further comprising setting said alternate intake and exhaust cam positions to less than or equal to approximately 4 degrees.

16. The method of claim 12 further comprising setting said alternate intake and exhaust cam positions to less than or equal to approximately 3 degrees.

17. The method of claim 12 further comprising setting said alternate intake and exhaust cam positions to less than or equal to approximately 2 degrees.

18. The method of claim 12 further comprising setting said alternate intake and exhaust cam positions to park positions.

19. The system of claim 11 wherein said parked cam positions include a 0° position relative to a crankshaft.

* * * * *